UNITED STATES PATENT OFFICE.

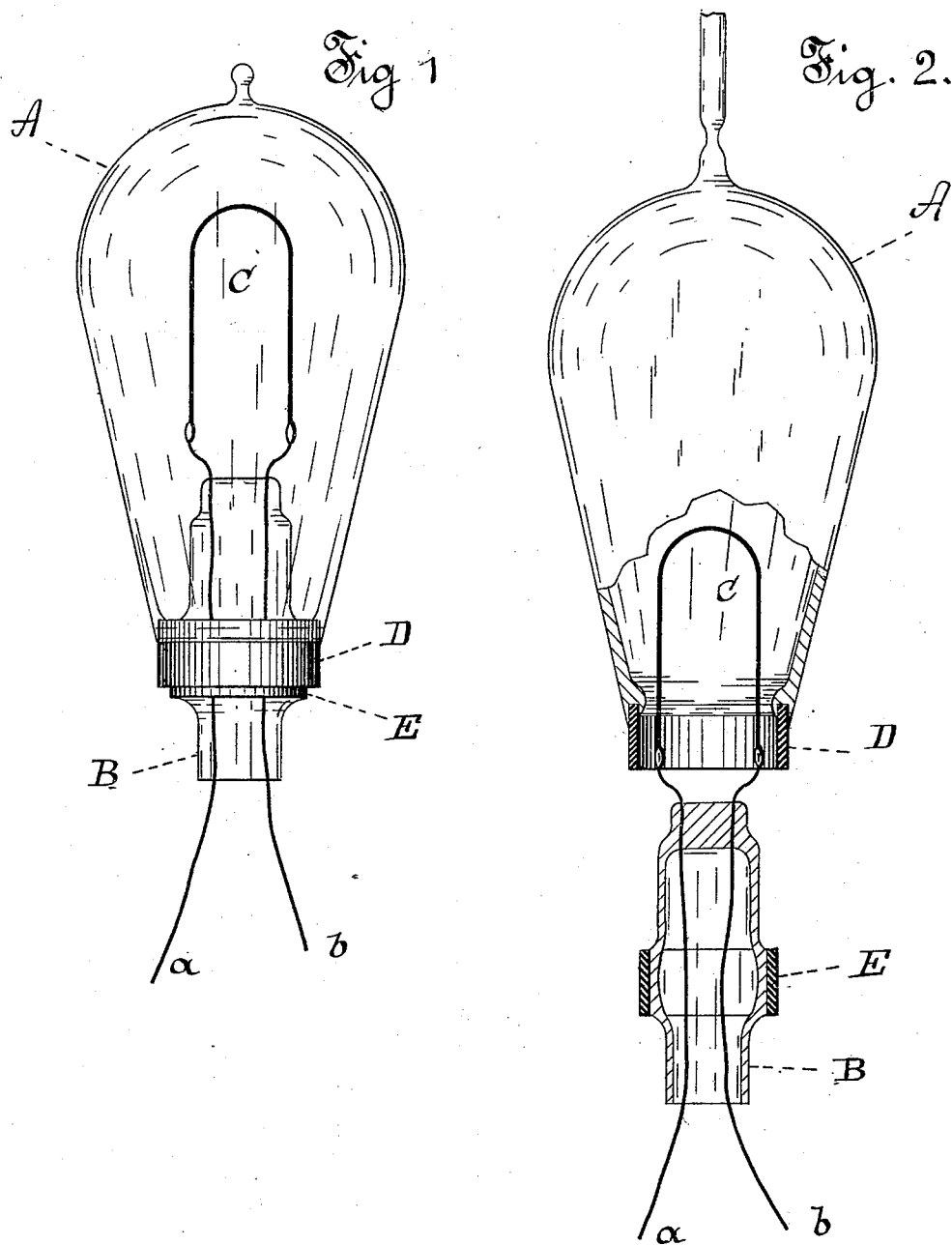

THOMAS A. EDISON, OF MENLO PARK, NEW JERSEY, ASSIGNOR TO THE EDISON ELECTRIC LIGHT COMPANY, OF NEW YORK, N. Y.

INCANDESCENT ELECTRIC LAMP.

SPECIFICATION forming part of Letters Patent No. 264,657, dated September 19, 1882.

Application filed August 30, 1881. (No model.)

*To all whom it may concern:*

Be it known that I, THOMAS A. EDISON, of Menlo Park, in the county of Middlesex and State of New Jersey, have invented a new and useful Improvement in Incandescent Electric Lamps, (Case No. 322;) and I do hereby declare that the following is a full and exact description of the same, reference being had to the accompanying drawings, and to the letters of reference marked thereon.

The object I have in view is to produce another form of incandescing electric lamp, which can be taken apart when the carbon is destroyed and the principal parts again utilized. This I accomplish by providing the lower end or neck of the glass bulb or globe with a ring of platinum, which is sealed into the glass of the globe and is soldered to another platinum ring sealed into the glass of the wire-support. After the platinum rings are soldered together the globe is exhausted and sealed. When the carbon is broken the platinum rings can be separated by melting the solder by heat or eating it away with acid, and the parts can be used over again, it being only necessary to supply a new carbon filament, to solder the platinum rings together again, and to re-exhaust and reseal the globe. For this last purpose the globe will be heated at the top, and will be perforated and provided with a glass tube for making connection with a suitable exhausting apparatus.

In the drawings, Figure 1 is a view of the lamp complete, and Fig. 2 a vertical section of the two parts of the lamp before the platinum rings are soldered together.

A is the glass globe; B, the glass wire-support; C, the carbon filament, and *a b* the leading-in wires. D is a platinum ring, sealed to the glass at the lower end of the neck of the globe, and E is another platinum ring, which is dropped over the upper end of the glass wire-support, and sealed to the glass of the enlarged portion of the wire-support. One of these rings is preferably smaller than the other, so that they fit closely one over the other. These platinum rings are soldered together before the lamp is exhausted. To separate the two glass portions of the lamp the solder can be melted or eaten away by acid.

It will be understood that the tubular glass wire-support B is hermetically sealed at its upper end by being flattened and fused upon the leading-in wires *a b*, such leading-in wires passing out through this tube. After the globe A is hermetically sealed at its lower end, and secured to the support B by the soldering of the platinum rings D E together, the lamp is exhausted by means of the glass tube attached to the globe, which is sealed off by fusion of the glass. The joints between the platinum rings and the two glass portions of the lamp are made air-tight by the fusion of the glass upon such rings.

What I claim is—

1. In an incandescing electric lamp, the combination, with the two portions of the lamp made entirely of glass, of a joint between said parts, composed of two platinum portions attached to the glass parts by the fusion of the glass upon them, said platinum portions being hermetically secured together, substantially as specified.

2. In an incandescing electric lamp, the combination of the two portions of the lamp made entirely of glass, the carbon filament supported from one of said glass portions by leading-in wires passing through and sealed into the glass by the fusion of the glass thereon, and a separable metallic joint between the two glass portions of the lamp, substantially as specified.

3. In an incandescing electric lamp, the combination of the two glass portions with the lamp, of the carbon filament supported from one of said glass portions by leading-in wires passing through and sealed into the glass by the fusion of the glass thereon, a sealed glass exhausting-tube on one of said glass portions, and a separable metallic joint between the two portions of the lamp, substantially as specified.

4. In an incandescing electric lamp, the combination, with the glass globe A, of a tubular glass wire-support, B, extending up into the globe and hermetically sealed at its upper end upon the leading-in wires, and the platinum rings D E, secured to the lower end of the globe and to the sides of said tubular support by the fusion of the glass upon said rings, such rings being secured together to form a separable air-tight joint, substantially as specified.

This specification signed and witnessed this 21st day of May, 1881.

THOMAS A. EDISON.

Witnesses:
  RICHD. N. DYER,
  H. W. SEELY.